(12) United States Patent
Muller et al.

(10) Patent No.: US 9,102,302 B2
(45) Date of Patent: Aug. 11, 2015

(54) PYROTECHNIC ACTUATOR ASSEMBLY AND AIRBAG MODULE COMPRISING SUCH ACTUATOR ASSEMBLY

(71) Applicant: TRW Airbag Systems GmbH, Aschau am Innl (DE)

(72) Inventors: Werner Muller, Muhldorf (DE); Karl Englbrecht, Erharting (DE); Martin Sedlmeier, Gangkofen (DE); Ingo Treiber, Steinhoring (DE); Desiree Koller, Neumarkt Sankt Veit (DE)

(73) Assignee: TRW AIRBAG SYSTEMS GMBH, Aschau am Inn (DE)

( * ) Notice: Subject to any disclaimer, the term of this patent is extended or adjusted under 35 U.S.C. 154(b) by 0 days.

(21) Appl. No.: 14/084,814

(22) Filed: Nov. 20, 2013

(65) Prior Publication Data

US 2014/0175776 A1   Jun. 26, 2014

(51) Int. Cl.
*B60R 21/26* (2011.01)
*B60R 21/264* (2006.01)
*F42B 3/00* (2006.01)
*B60R 21/2338* (2011.01)

(52) U.S. Cl.
CPC ........... *B60R 21/264* (2013.01); *B60R 21/2338* (2013.01); *F42B 3/006* (2013.01); *B60R 2021/23384* (2013.01); *B60R 2021/23388* (2013.01)

(58) Field of Classification Search
CPC ................. B60R 21/26; B60R 21/264; B60R 2021/23386; F42B 3/006
USPC .......... 280/736, 741, 743.2; 102/202.14, 530, 102/531
See application file for complete search history.

(56) References Cited

U.S. PATENT DOCUMENTS

| 7,357,083 | B2 * | 4/2008 | Takahara et al. ............... 102/530 |
| 7,980,591 | B2 * | 7/2011 | Schonhuber et al. ......... 280/737 |
| 8,628,114 | B1 * | 1/2014 | Quioc ........................ 280/743.2 |
| 2002/0043790 | A1 | 4/2002 | Elqadah et al. |
| 2002/0158456 | A1 | 10/2002 | Fischer |
| 2004/0255811 | A1 | 12/2004 | Brede et al. |

(Continued)

FOREIGN PATENT DOCUMENTS

| DE | 10215787 | 12/2002 |
| DE | 10256436 | 7/2003 |
| DE | 10303377 | 8/2004 |
| DE | 102004042359 | 5/2005 |

(Continued)

*Primary Examiner* — Paul N Dickson
*Assistant Examiner* — Robert A Coker
(74) *Attorney, Agent, or Firm* — Tarolli, Sundheim, Covell & Tummino LLP

(57) ABSTRACT

The invention relates to a pyrotechnic actuator assembly (10) for release of a retaining means (12) in a vehicle safety system (14) comprising a housing (16) composed of a first housing part (18) and a second housing part (20) fixedly connected to the first housing part (18), the two housing parts (18, 20) forming a substantially tight housing chamber (22), a pyrotechnic charge (24) received in the housing chamber (22) as well as an electric ignition unit (26) for triggering of the pyrotechnic charge (24), wherein the electric ignition unit (26) extends from outside of the housing chamber (22) through the first housing part (18) into the housing chamber (22), and wherein the housing (16) includes a housing chamber portion (28) to which the pyrotechnic charge (24) is directly adjacent and includes a contact portion (30) for fastening the retaining means (12). Moreover the invention also comprises an airbag module of a vehicle safety system including such actuator assembly (10).

22 Claims, 2 Drawing Sheets

(56) References Cited

U.S. PATENT DOCUMENTS

| | | |
|---|---|---|
| 2005/0057027 A1 | 3/2005 | Fogle, Jr. et al. |
| 2005/0127649 A1* | 6/2005 | Smith .......................... 280/741 |
| 2009/0167006 A1 | 7/2009 | Schonhuber et al. |
| 2010/0187797 A1 | 7/2010 | Debler et al. |

FOREIGN PATENT DOCUMENTS

| | | |
|---|---|---|
| DE | 19728658 | 1/2007 |
| DE | 102005058721 | 6/2007 |
| DE | 102009005771 | 7/2010 |
| WO | WO 2005087549 A1 * | 9/2005 |

* cited by examiner

PYROTECHNIC ACTUATOR ASSEMBLY AND AIRBAG MODULE COMPRISING SUCH
ACTUATOR ASSEMBLY

BACKGROUND OF THE INVENTION

The invention relates to a pyrotechnic actuator assembly for release of a retaining means in a vehicle safety system as well as an airbag module of a vehicle safety system comprising such actuator assembly.

In engineering, for example also in vehicle safety engineering, explosive studs are used as actuator units. As a rule, they are extremely robust metallic components adapted to be fastened via a thread and to absorb very high forces. Correspondingly high is the required activating energy of these explosive studs so that they expose housing apertures, for example, displace components (sometimes against a compressive force) or break them into preferably two fragments, i.e. so-to-speak cut themselves through.

In current vehicle safety systems, especially in the case of airbag modules, it is endeavored to adapt the safety system more and more individually to different parameters of a crash situation. A known and advantageous possibility is the use of retaining means such as tethers by release of which discharge orifices are opened or closed. By means of such retaining means also the airbag geometry can be alternatively or additionally influenced and/or an additional airbag volume can be released.

For active release of the tethers a tether activation unit "TAU" as it is called is required. Said TAUs are usually shear-stressed by comparatively low transverse force loads.

Conventional explosive studs are frequently over-dimensioned and too expensive for these applications.

For this reason, in DE 10 2005 058 721 A1 already pyrotechnic actuator units which have a plastic housing and therefore can be manufactured at reasonable cost are disclosed for actuation of a vehicle safety system.

In DE 10 2005 058 721 A1 a prefabricated already independently tested ("qualified") pyrotechnic igniter is used which has to be supplied as separate component during manufacture of an actuator unit. This prefabricated component is then accommodated in a housing, especially a plastic housing, the housing including a portion for fixing the retaining means and a detent portion for fastening the actuator unit. After manufacturing the pyrotechnic actuator unit, it has to be tested and qualified again, before it can be mounted in a vehicle safety system.

SUMMARY OF THE INVENTION

It is the object of the invention concerning the pyrotechnic actuator assembly to provide a compact pyrotechnic actuator assembly for release of a retaining means which can be manufactured at low cost with especially little manufacturing and testing effort.

This object is achieved, according to the invention, by a pyrotechnic actuator assembly for release of a retaining means, especially a tether, in a vehicle safety system, comprising a housing which is composed of a first housing part and a second housing part fixedly connected to the first housing part, the two housing parts forming a substantially tight housing chamber, a pyrotechnic charge being directly received in the housing chamber as well as an electric ignition unit for triggering the pyrotechnic charge, wherein the electric ignition unit extends from outside of the housing chamber through the first housing part into the housing chamber, and wherein the housing includes a housing chamber portion to which the pyrotechnic charge is adjacent as well as a contact portion on which the retaining means can act for fastening the retaining means.

Compared to the state of the art in which a housing of the prefabricated pyrotechnic igniter encapsulates the pyrotechnic charge and another separate housing accommodates the prefabricated igniter, fixes the retaining means and fastens the actuator assembly, in the pyrotechnic actuator assembly according to the invention merely one single housing is provided to which the pyrotechnic charge is adjacent directly on its inside and on which the retaining means can act. Since in this case the pyrotechnic actuator assembly can do without a prefabricated and tested or qualified pyrotechnic igniter, the total manufacturing and testing effort for the pyrotechnic actuator assembly is considerably reduced.

Preferably the electric ignition unit of the actuator assembly comprises electric connecting pins extending through the first housing part as well as a bridge member joining the connecting pins and extending into the housing chamber to ignite the pyrotechnic charge. The first housing part especially further includes a cavity in the area of the connecting pins facing away from the bridge member and in a simple way forms an electric connecting element, especially a plug connector by which the pyrotechnic actuator assembly can be connected to an electrical system of the vehicle with little effort.

The housing preferably has a recess for fixing the retaining means in the area of the contact portion. The recess can be circumferential with respect to a longitudinal axis of the housing for example in the circumferential direction so that a retaining means in the form of a tether can be easily and reliably fixed via a loop formed at the tether end.

In an embodiment of the pyrotechnic actuator assembly said recess is a holding groove for preferably permanently fastening the retaining means. A permanent fastening of the retaining means is to be understood in this context so that the retaining means is fastened to the housing both before and after activation of the actuator assembly. Upon activation of the actuator assembly the contact portion of the housing is separated from a fixed fastening portion of the housing so as to release the retaining means. Due to the permanent fastening of the retaining means on the contact portion the freedom of movement of the contact portion is restricted by the retaining means so that no undesired loosely floating fragment is formed.

In an alternative embodiment of the actuator assembly the recess is a notch in the form of a predetermined breaking point. In this way an exactly defined housing breaking point can be determined with little effort upon activation of the actuator assembly.

Furthermore, also a connection between the two housing parts can be a predetermined breaking point. In this way, too, an exactly defined housing breaking point can be determined with little effort upon activation of the actuator assembly.

In a further embodiment of the actuator assembly the second housing part is made of a material which after activation of the actuator assembly breaks into a plurality of loose fragments whose maximum dimension is not more than 8 mm, especially not more than 5 mm, especially not more than 3 mm. The actually undesired loose housing fragments are so small in this case that no relevant impairment of the vehicle safety system has to be expected. When the actuator assembly is properly arranged in an airbag module, no special measures have to be taken to withhold said housing fragments. Preferably the second housing part in this case is especially thin-walled and/or made of especially brittle material.

In another embodiment of the pyrotechnical actuator assembly either of the housing parts, particularly the second housing part, includes a detent portion for fastening the actuator assembly. This permits simple and quick mounting of the actuator assembly. When the detent portion is formed on the second housing part, it is moreover beneficial that after activation of the actuator assembly the blasted first housing part is restricted as to its freedom of movement via an electric connector cable and thus constitutes no undesired loose housing fragment.

In an especially preferred manner the two housing parts constitute plastic parts welded to each other. The fabrication of plastic material enables the housing shape to be easily adapted to different available space or marginal conditions as well as an extremely low cost housing fabrication. Welding of the plastic parts allows a quick and especially reliable and stable interconnection of the plastic parts. In particular in ultrasonic welding the heat input is locally restricted so that the pyrotechnic charge encapsulated by the housing is not affected. Alternatively, also adhesive bonding of the two housing parts is possible, as a matter of course.

It is the object of the invention concerning the airbag module of a vehicle safety system to provide an inexpensive, compact airbag module that can be easily manufactured.

In accordance with the invention, this object is achieved by an airbag module of a vehicle safety system comprising an afore-described actuator assembly according to the invention, an airbag for restraining a vehicle occupant, an inflator for filling the airbag with inflator gas as well as a modular housing for accommodating the folded airbag and/or the inflator, the actuator assembly being fastened to the inflator or to the modular housing. For example, the actuator assembly is fastened, especially locked, to the inflator or to the modular housing via the housing, especially the first or second housing part of the housing.

In an advantageous embodiment the airbag module comprises a retaining means in the form of a tether, wherein one axial end of the tether is arranged at the airbag and an opposite axial end of the tether is arranged at the contact portion of the housing of the actuator assembly.

In another advantageous embodiment the airbag module comprises the actuator assembly which is permanently fastened, especially locked, to the inflator or the modular housing either by means of the first housing part through which the electric connecting pins are extending or by means of the second housing part including no electric connecting pins, so that upon activation of the actuator assembly the second housing part or correspondingly the first housing part of the actuator assembly can be blasted off. Permanent fastening of the respective housing part has to be understood in this context such that the housing part is fastened to the inflator or the modular housing even after activation of the actuator assembly.

BRIEF DESCRIPTION OF THE DRAWINGS

Further features and advantages of the invention are resulting from the following description of preferred embodiments with reference to the drawing in which.

DESCRIPTION OF EMBODIMENTS

Figure 1:
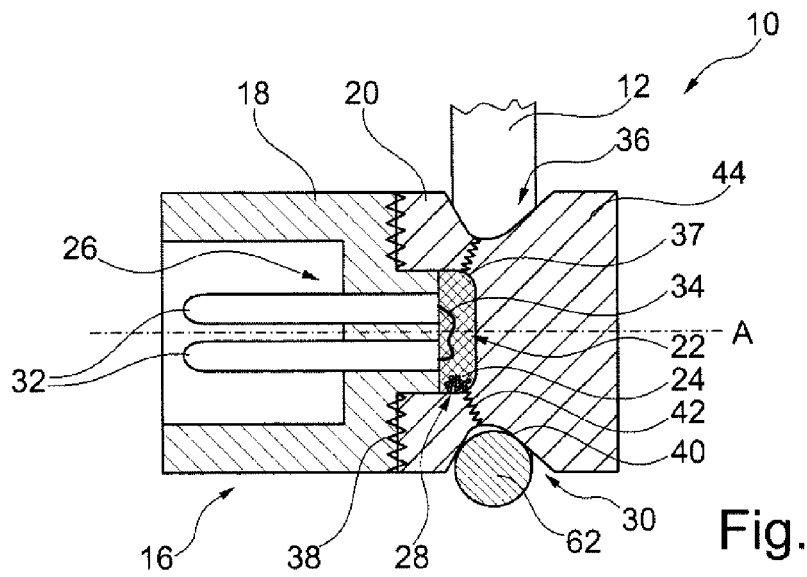
FIG. 1 shows a schematic longitudinal section across a pyrotechnic actuator assembly of the invention according to a first embodiment.

FIGS. 1 to 4 illustrate different embodiments of a pyrotechnic actuator assembly 10 for release of a retaining means 12 in the form of a tether in a vehicle safety system 14.

A housing 16 of the pyrotechnic actuator assembly 10 is composed of a first housing part 18 as well as a second housing part 20 fixedly connected to the first housing part 18 and includes a substantially tight housing chamber 22 restricted both by the first housing part 18 and by the second housing part 20. Furthermore the actuator assembly 10 comprises a pyrotechnic charge 24 being directly received in the housing chamber 22 as well as an electric ignition unit 26 for triggering and igniting the pyrotechnic charge 24.

The electric ignition unit 26 extends from outside of the housing chamber 22 through the first housing part 18 into the housing chamber 22. The electric ignition unit 26 includes electric connecting pins 32 extending through the first housing part 18 and a bridge element 34 joining the connecting pins 32 and extending into the housing chamber 22 for igniting the pyrotechnic charge 24. The bridge element 34 constitutes an electrically conductive connection between the connecting pins 32 and may comprise, for instance, a bridge wire, a thin-film element or a semiconductor element. The pyrotechnic charge 24 includes the entire pyrotechnic material required for the actuator assembly 10 and completely accommodated in the single housing chamber 22. In this case the pyrotechnic charge 24 may comprise one single or plural pyrotechnic single charges or pyrotechnic single sets which especially are directly adjacent to each other.

The housing 16 comprises a housing chamber portion 28 to which the pyrotechnic charge 24 is adjacent as well as a contact portion 30 on which the retaining means 12 can act for fastening the retaining means 12.

In the embodiments according to FIGS. 1 to 4 the second housing part 20 of the housing 16 includes both the housing chamber portion 28 and the contact portion 30. In this way the two housing parts 18, 20 are separated as to function which is advantageous in terms of manufacture.

The first housing part 18 mainly fulfills the function of an electric plug connector by which the actuator assembly 10 can be connected to an electrical system of the vehicle. For example, the first housing part 18 is an injection-molded plastic part into which the electric connecting pins 32 of the electric ignition unit 26 are injected in portions.

On the other hand, the second housing part 20 primarily fulfills the function of fixing the retaining means, with the second housing part 20 of the housing 16 having a recess 36 in the area of the contact portion 30 for fixing the retaining means 12 in the form of a tether. With respect to a longitudinal axis A of the housing 16 the recess 36 is formed to be circumferential in the circumferential direction so that the tether can be easily and reliably fixed via a loop formed at the tether end.

The housing chamber 22 is restricted by both housing parts 18, 20 so that after separate manufacture of the housing parts 18, 20 the housing chamber 22 can be filled with the pyrotechnic charge 24 and can be sealed by connecting the two housing parts 18, 20. In each of the shown embodiments the second housing part 20 has a cup-shaped recess 37 into which the pyrotechnic charge 24 can be filled. In the manufacturing process of the actuator assembly the second housing part 20 is reasonably oriented in such way that the filling aperture of the recess 37 is facing upwards and the pyrotechnic charge 24 can be supplied from above. Subsequently the first housing part 20 is supplied (equally from above) which forms in the area of the electric ignition unit 26 a largely accurately fitting closure for the recess 37 in the second housing part 20 so that between the housing parts 18, 20 the housing chamber 22 is formed in which the pyrotechnic charge 24 is encapsulated. Finally the two housing parts 18, 20 are fixedly connected to each other. The housing chamber 22 is tightly sealed after connecting the housing parts 18, 20.

In the shown embodiments the two housing parts 18, 20 are plastic parts welded to each other. A stable and permanent connection of the housing parts 18, 20 can be quickly produced especially by ultrasonic welding, wherein during ultrasonic welding the heat input can be locally restricted so that the pyrotechnic charge 24 is not affected. Preferably the welding of the housing parts 18, 20 is not effected directly up to the housing chamber 22 but ends at a predetermined distance from the housing chamber 22. This is indicated in FIGS. 1 to 4, the area of welding of the housing parts 18, 20 being indicated by a zigzag line 38.

As an alternative to welding, also adhesive bonding of the housing parts 18, 20 is possible, as a matter of course.

FIG. 1 shows a first embodiment of the actuator assembly 10 in which the recess 36 provided in the housing 16 is a notch 4 capable of at least partly receiving and thus simply and reliably fixing the retaining means 12, which in the present case is a tether. Moreover, with little effort an exactly defined predetermined breaking point at which the housing 16 breaks upon activation of the pyrotechnic actuator assembly 10 can be determined by said notch 40, wherein in FIG. 1 a corresponding breaking point of the second housing part 20 predefined by the notch 40 is indicated and is provided with the reference numeral 42.

In general, an activation of the pyrotechnic actuator assembly 10 finally always results in the actuator assembly to break apart, i.e. so-to-speak to destroy itself, by fracture, especially defined fracture of the housing 16.

In the embodiment according to FIG. 1 after fracture of the second housing part 20 a usually undesired loose fragment 44 is occurring at the breaking point 42. A freedom of movement of such fragment 44 is usually restricted by appropriate restraining means so as to prevent impairment of the vehicle safety system 14.

Figure 2:
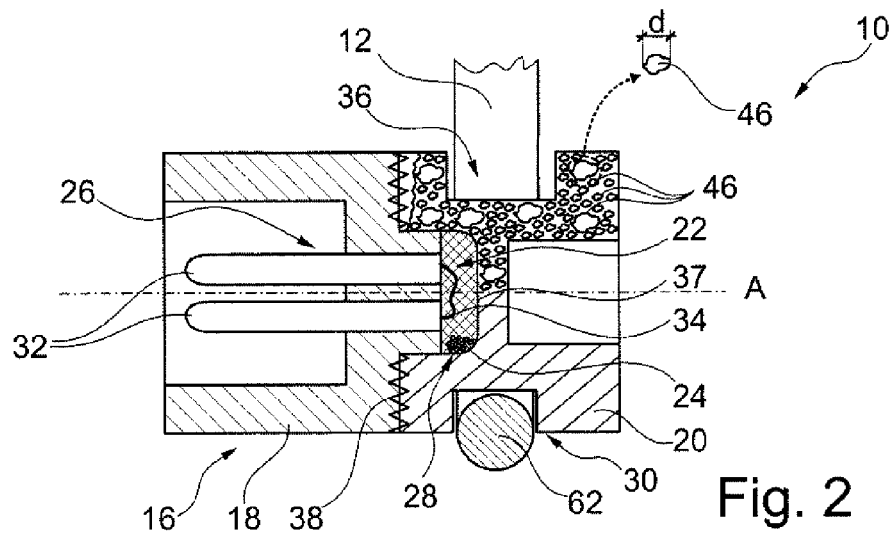
FIG. 2 shows a schematic longitudinal section across a pyrotechnic actuator assembly of the invention according to a second embodiment.

FIG. 2 illustrates a second embodiment of the pyrotechnic actuator assembly 10 in which the second housing part 20 is made of a material which upon activation of the actuator assembly 10 breaks into a plurality of loose fragments 46 the largest dimension d of which is not more than 8 mm, especially not more than 5 mm, especially not more than 3 mm. Said fragmenting of the second housing part 20 is schematically indicated in FIG. 2 above the longitudinal axis A. It has turned out that in the case of such small fragments 46 no special measures for withholding them have to be taken. When the actuator assembly 10 is properly arranged in an airbag module 48 (cf. FIG. 5), the fragments 46 can be withheld by a modular housing 50 or, for instance, by an airbag 52, wherein no impairment of the airbag module 48 has to be expected due to the small size and mass of the fragments 46.

In order to ensure breaking into sufficiently small fragments 46 the second housing part 20 is especially thin-walled and/or made of especially brittle material in this embodiment.

Figure 3:
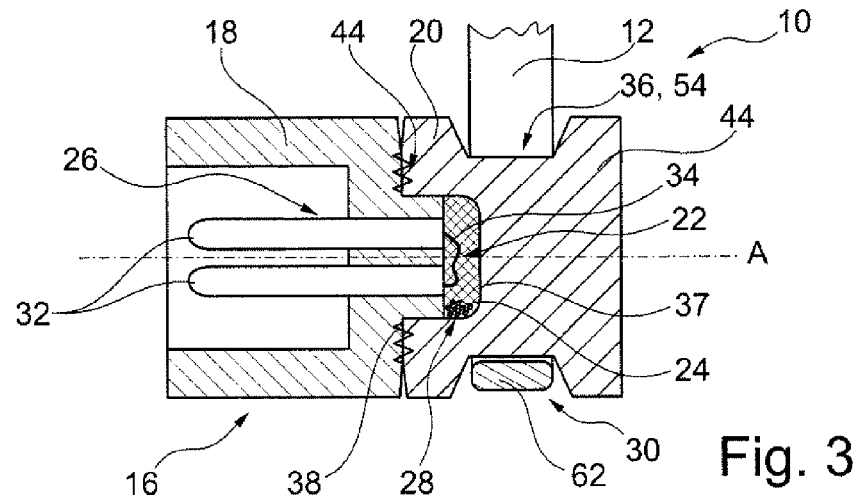
FIG. 3 shows a schematic longitudinal section across a pyrotechnic actuator assembly of the invention according to a third embodiment.

FIG. 3 illustrates a third embodiment of the actuator assembly 10 in which the recess 36 in the second housing part 20 is a holding groove 54 for permanently fastening the retaining means 12 in the form of a tether. In this context "permanent fastening" has to be understood so that the tether is fastened to the housing 16 both before and after activation of the actuator assembly 10. Upon activation of the actuator assembly 10 the contact portion 30 of the housing 16 is separated from a fixed fastening portion of the housing 16 so as to release the tether. Due to the permanent fastening of the tether on the contact portion 30 the freedom of movement of the contact portion 30 is restricted by the tether, however, so that no undesired loosely floating fragment occurs.

According to FIG. 3, the connection, concretely the welding 38, is formed as predetermined breaking point between the two housing parts 18, 20. Thus the connection of the housing parts 18, 20 and the design of the predetermined breaking point can be combined in one single process step. Furthermore a desired breaking resistance of the housing 16 can be adjusted with little effort by simply adapting the connecting means. If said breaking resistance of the housing 16 is exceeded upon activation of the pyrotechnic actuator assembly 10, the housing 16 breaks at the predetermined breaking point.

In the embodiment according to FIG. 3 the separated fragment 44 of the housing 16 is substantially identical to the second housing part 20. The third embodiment of the actuator assembly 10 offers the advantage that said fragment 44 remains fixed to the retaining means 12 in the form of a tether and thus the freedom of movement thereof is restricted.

Figure 4:
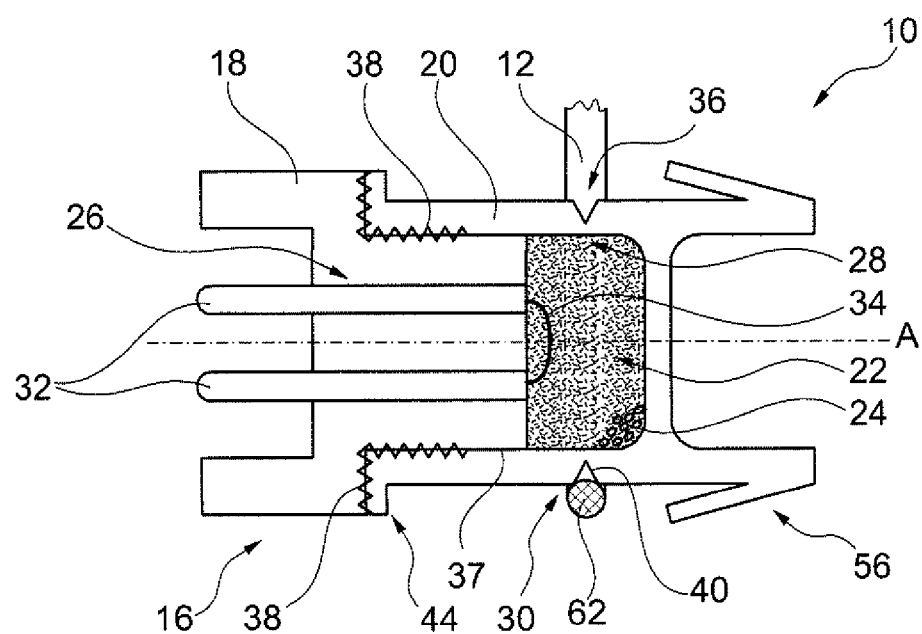
FIG. 4 shows a schematic longitudinal section across a pyrotechnic actuator assembly of the invention according to a fourth embodiment.

FIG. 4 finally shows a fourth embodiment of the actuator assembly 10 in which either of the housing parts 18, 20 includes a detent portion 56 for fastening the actuator assembly 10. According to FIG. 4, the detent portion 56 is formed at an axial end of the second housing part 20 facing away from the first housing part 18.

The fastening of the actuator assembly 10, for example to the modular housing 50 or an inflator 58 of the vehicle safety system 14, is no longer performed, unlike the aforementioned embodiments, by the first housing part 18 but by the detent portion 56 on the second housing part 20. After activation of the actuator assembly 10 and a fracture of the housing 16 at the notch 40 in the form of a predetermined breaking point, according to FIG. 4 thus a housing portion including the detent portion 56 remains fixed, whereas a housing portion including the electric ignition unit 26 is blasted off and forms a movable fragment 44.

Said movable fragment 44 cannot loosely float, however, as its movement of freedom is restricted by a connecting cable (not shown) of the electric ignition unit 26. The connection between the connecting cable on the one hand and the electric connecting pins 32 of the electric ignition unit 26 and/or the first housing part 18 on the other hand in this case is preferably reinforced so as to reliably prevent the fragment 44 from detaching from the electric connecting cable. Especially such connection can comprise a lockable plug connection or a so called "lead wire" connection, a cable attached or welded to the electric connecting pins 32, preferably surrounded by the first housing part 18 by injection-molding.

Figure 5:
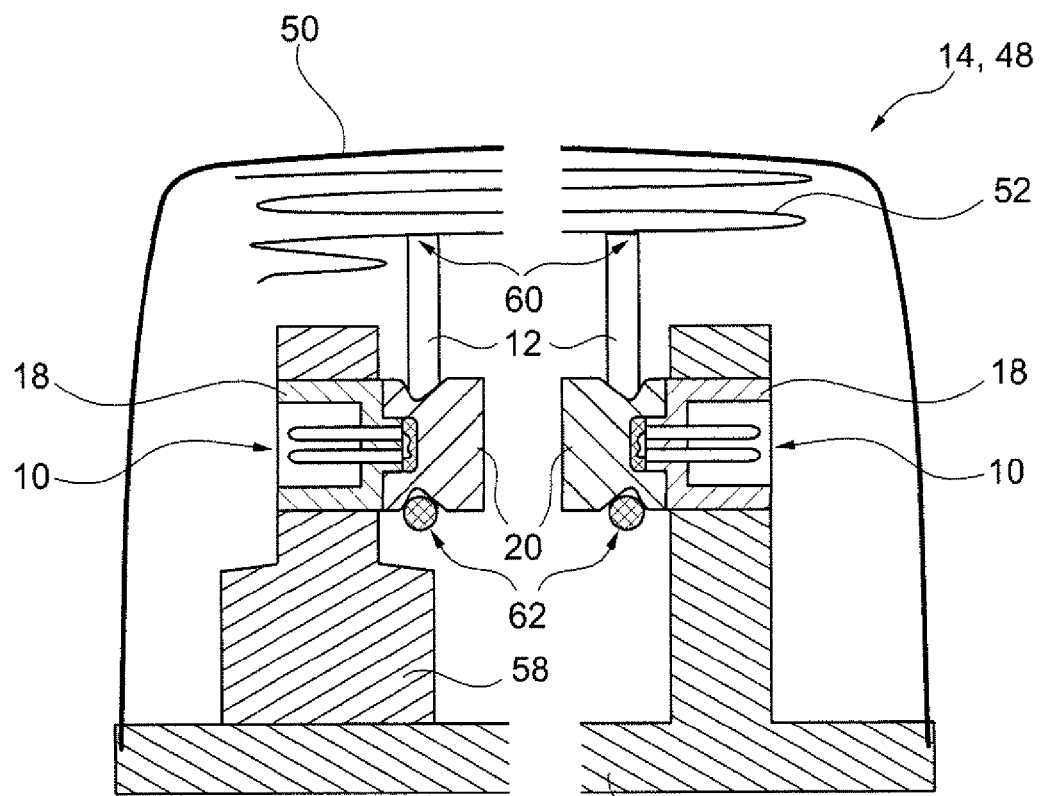
FIG. 5 shows a schematic section of two alternative actuator assemblies according to the invention as can be arranged in an airbag module according to the invention.

FIG. 5 schematically shows an airbag module 48 of the vehicle safety system 14 comprising the pyrotechnic actuator assembly 10 according to FIG. 1, the airbag 52 for restraining a vehicle occupant, the inflator 58 for filling the airbag 52 with inflator gas as well as the modular housing 50 for receiving the folded airbag 52 and/or the inflator 58, wherein the actuator assembly 10 is fastened to the inflator 58 or to the modular housing 50.

According to FIG. 5, the first housing part 18 of the actuator assembly 10 is concretely fastened to the inflator 58 and the modular housing 50, respectively. In a specific configuration variant the first housing part 18 can even be integrated in one piece in the modular housing 50 made of plastic.

Here FIG. 5 shows in its left half an embodiment in which the actuator assembly 10 is fastened to the inflator 58. In the right half of FIG. 5 a different embodiment is shown in which the actuator assembly 10 is fastened to the modular housing 50. In the airbag module 48 of the vehicle safety system 14 both afore-mentioned embodiments, viz. that of the left and that of the right half of FIG. 5, can be provided. This is not compulsory, however, so that only one of the afore-mentioned embodiments can be provided in the airbag module 48.

When an actuator assembly 10 according to FIG. 4 is employed, the second housing part 20 of the actuator assembly 10 is fastened, especially locked, to the inflator 58 or to the modular housing 50.

According to FIG. 5, the airbag module 48 comprises the retaining means 12 in the form of a tether, wherein an axial end 60 of the tether is arranged on the airbag 52 and an opposite axial end 62 of the tether is arranged on the contact portion 30 of the housing 16 of the actuator assembly 10. By activation of the actuator assembly 10 the tether can be released with little effort, whereby a discharge orifice in the airbag module 48 can be opened or closed, the airbag geometry can be influenced and/or an additional airbag volume can be released.

The invention claimed is:

1. A pyrotechnic actuator assembly (10) for release of a retaining means (12) in a vehicle safety system (14) comprising:
   a housing (16) composed of a first housing part (18) and a second housing part (20) fixedly connected to the first housing part (18), the two housing parts (18, 20) forming a substantially tight housing chamber (22),
   a pyrotechnic charge (24) received in the housing chamber (22) and abutting the first housing part (18) and the second housing part (20), and
   an electric ignition unit (26) for triggering the pyrotechnic charge (24),
   wherein the electric ignition unit (26) extends from outside of the housing chamber (22) through the first housing part (18) into the housing chamber (22), and
   wherein the housing (16) includes a housing chamber portion (28) to which the pyrotechnic charge (24) is directly adjacent as well as a contact portion (30) for fastening the retaining means (12).

2. The actuator assembly according to claim 1, wherein the electric ignition unit (26) comprises electric connecting pins (32) extending through the first housing part (18) as well as a bridge element (34) joining the connecting pins (32) and extending into the housing chamber (22) for igniting the pyrotechnic charge (24).

3. The actuator assembly according to claim 1, wherein the housing (16) has a recess (36) adjacent the contact portion (30) for fixing the retaining means (12), wherein the recess (36) is a holding groove (54) for permanently fastening the retaining means (12).

4. The actuator assembly according to claim 1, wherein the housing (16) includes a recess (36) adjacent the contact portion (30), the recess (36) being a notch (40) in the form of a predetermined breaking point (42).

5. The actuator assembly according to claim 1, wherein a connection between the two housing parts (18, 20) is in the form of a predetermined breaking point.

6. The actuator assembly according to claim 1, wherein the second housing part (20) is made of a material which after actuation of the actuator assembly (10) breaks into a plurality of loose fragments (46) the largest dimension (d) of which is not more than 8 mm.

7. The actuator assembly according to claim 1, wherein either of the housing parts (18, 20) includes a detent portion (56) for fastening the actuator assembly (10).

8. An airbag module of a vehicle safety system (14) comprising:
   an actuator assembly (10) according to claim 1,
   an airbag (52) for restraining a vehicle occupant,
   an inflator (58) for filling the airbag (52) with inflator gas,
   as well as a modular housing (50) for accommodating the folded airbag (52) and/or the inflator (58),
   wherein the actuator assembly (10) is fastened to the inflator (58) or to the modular housing (50).

9. The airbag module according to claim 8, wherein the airbag module (48) comprises a retaining means (12) in the form of a tether, wherein an axial end (60) of the tether is arranged on the airbag (52) and an opposite axial end (62) of the tether is arranged on the contact portion (30) of the housing (16) of the actuator assembly (10).

10. The airbag module according to claim 8, wherein the actuator assembly (10) is permanently fastened to the inflator (58) or the modular housing (50) either by means of the first housing part (18) through which the electric connecting pins (32) are extending or by means of the second housing part (20) having no electric connecting pins, so that upon activation of the actuator assembly (10) the second housing part (20) or, correspondingly, the first housing part (18) of the actuator assembly can be blasted off.

11. The actuator assembly according to claim 1, wherein the two housing parts (18, 20) are plastic parts welded to each other.

12. A pyrotechnic actuator assembly (10) for release of a retaining means (12) in a vehicle safety system (14) comprising:
   a housing (16) composed of a first housing part (18) and a second housing part (20) fixedly connected to the first housing part (18), the two housing parts (18, 20) forming a substantially tight housing chamber (22),
   a pyrotechnic charge (24) received in the housing chamber (22) and exposed to the first housing part (18) and the second housing part (20), and
   an electric ignition unit (26) for triggering the pyrotechnic charge (24),
   wherein the electric ignition unit (26) extends from outside of the housing chamber (22) through the first housing part (18) into the housing chamber (22), and
   wherein the housing (16) includes a housing chamber portion (28) to which the pyrotechnic charge (24) is directly adjacent as well as a contact portion (30) for fastening the retaining means (12).

13. The actuator assembly according to claim 12, wherein the electric ignition unit (26) comprises electric connecting pins (32) extending through the first housing part (18) as well as a bridge element (34) joining the connecting pins (32) and extending into the housing chamber (22) for igniting the pyrotechnic charge (24).

14. The actuator assembly according to claim 12, wherein the housing (16) has a recess (36) adjacent the contact portion (30) for fixing the retaining means (12), wherein the recess (36) is a holding groove (54) for permanently fastening the retaining means (12).

15. The actuator assembly according to claim 12, wherein the housing (16) includes a recess (36) adjacent the contact portion (30), the recess (36) being a notch (40) in the form of a predetermined breaking point (42).

16. The actuator assembly according to claim 12, wherein a connection between the two housing parts (18, 20) is in the form of a predetermined breaking point.

17. The actuator assembly according to claim 12, wherein the second housing part (20) is made of a material which after actuation of the actuator assembly (10) breaks into a plurality of loose fragments (46) the largest dimension (d) of which is not more than 8 mm.

18. The actuator assembly according to claim 12, wherein either of the housing parts (18, 20) includes a detent portion (56) for fastening the actuator assembly (10).

19. An airbag module of a vehicle safety system (14) comprising:
   an actuator assembly (10) according to claim 15,
   an airbag (52) for restraining a vehicle occupant,
   an inflator (58) for filling the airbag (52) with inflator gas,
   as well as a modular housing (50) for accommodating the folded airbag (52) and/or the inflator (58),
   wherein the actuator assembly (10) is fastened to the inflator (58) or to the modular housing (50).

20. The airbag module according to claim 19, wherein the airbag module (48) comprises a retaining means (12) in the form of a tether, wherein an axial end (60) of the tether is arranged on the airbag (52) and an opposite axial end (62) of the tether is arranged on the contact portion (30) of the housing (16) of the actuator assembly (10).

21. The airbag module according to claim 19, wherein the actuator assembly (10) is permanently fastened to the inflator (58) or the modular housing (50) either by means of the first housing part (18) through which the electric connecting pins (32) are extending or by means of the second housing part (20) having no electric connecting pins, so that upon activation of the actuator assembly (10) the second housing part (20) or, correspondingly, the first housing part (18) of the actuator assembly can be blasted off.

22. The actuator assembly according to claim 12, wherein the two housing parts (18, 20) are plastic parts welded to each other.

* * * * *